United States Patent Office 3,067,218
Patented Dec. 4, 1962

3,067,218
2α,17α-DIMETHYL DERIVATIVES OF THE ANDROSTANE SERIES
Raymond L. Pederson, Kalamazoo, John C. Babcock, Portage Township, Kalamazoo County, and John A. Hogg, Kalamazoo, Mich.
No Drawing. Filed June 9, 1958, Ser. No. 740,517
2 Claims. (Cl. 260—397.45)

This invention is a continuation-in-part of our application Serial No. 547,309, filed November 16, 1955, now U.S. Patent 2,883,401 and relates to novel steroid compounds, more particularly to novel synthetic hormones of the androstane series, and to novel intermediates in their preparation and to the process for their production.

The novel compounds of this invention, 9α-fluoro-11-oxygenated 2α-methyl-17α-lower-alkyltestosterones (VI and VII below), especially those wherein the lower-alkyl group is methyl, possess pronounced oral anabolic activity with little androgenic activity or salt retention, thus rendering them effective in therapy requiring an anabolic agent where accompanying androgenic activity is undesirable, e.g., in the treatment of osteoporosis in females. The absence of androgenic activity is in sharp contrast to the pronounced androgenic activity of 9α-fluoro-11-oxygenated-17α-methyltestosterones. These novel compounds (VI and VII) of the present invention are also effective in inhibiting pituitary gonadotropins without exhibiting estrogenic effects and therefore find use in the management of menopausal problems. In addition the novel compounds (VI and VII) are effective anti-inflammatory agents.

The novel products and processes of the present invention may be represented by the following formulae:

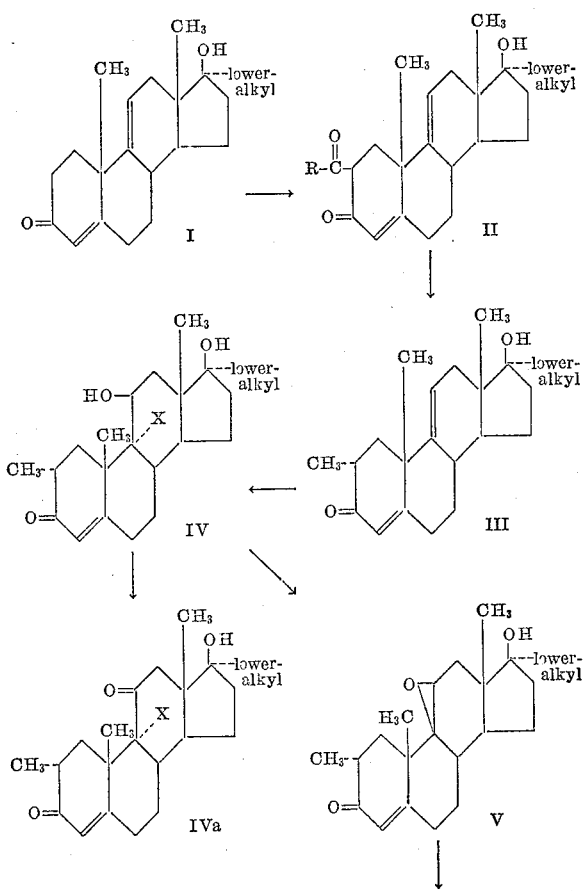

wherein the lower-alkyl groups each contain from one to eight carbon atoms, inclusive, and are preferably methyl, and X is a halogen having an atomic weight from 35 to 127, inclusive, i.e., chlorine, bromine or iodine, and R is selected from the group consisting of hydrogen, carbonyl lower-alkoxy, lower-alkoxy and trifluoromethyl.

It is an object of the present invention to supply novel synthetic steroid hormones of the androstane series. Another object is the provision of steroid intermediates readily convertible to these synthetic steroid hormones. Still another object is to furnish a process for the production of these steroid compounds. Other objects will be apparent to those skilled in the art to which this invention pertains.

According to the present invention a 9(11)-dehydro-17α-lower-alkyltestosterone represented by Formula I, is converted to the novel physiologically active steroid compounds (VI) of the present invention by the following reactions: first, glyoxylation, formylation, carboxylation or trifluoroacetylation to produce a 2-carbonyl derivative (II); second, alkylation to produce the corresponding 2-methyl 2-carbonyl compound; third, removal of the 2-carbonyl group to produce the 2-methyl compound (III); fourth, halohydrination, e.g., bromohydrination to produce a 9α-bromo-11β-hydroxy-2α-methyl-17α-lower-alkyl derivative (IV); fifth, dehydrohalogenation to produce the corresponding 9β,11β-epoxy-compound (V); and sixth, hydrochlorination or hydrofluorination to convert the epoxy structure to the corresponding 9α-chloro or 9α-fluoro compound (VI). If desired the 9α-fluoro-11β-hydroxy derivatives represented by Formulae IV and VI or the corresponding 9α-chloro compounds can be converted to the corresponding 11-keto compounds by oxidation with chromium trioxide dissolved in acetic acid.

The starting 9(11)-dehydro-17α-lower-alkyltestosterone (I) can be prepared as described in Preparation 1A. This starting steroid is converted to 9(11)-dehydro-2α-methyl-17α-lower-alkyltestosterone (III) in the manner described in Examples 1 and 2. (I) can also be utilized for the production of 9β,11β-epoxy-17α-lower-alkyltestosterone (see Preparation 1B and 1C), which in turn can be readily converted to 9β,11β-epoxy-2α-methyl-17α-lower-alkyltestosterone (V) in the manner described in Examples 6 and 7.

In addition to the route indicated in the above flowsheet for the production of 9(11)-dehydro-2α-methyl-17α-lower-alkyl testosterone (III), this compound can also be prepared in the manner described in Preparation 4 from the starting steroid 11β-hydroxy-2α-methyl-17α-lower-alkyltestosterone (see Preparation 2).

The following preparations and examples are illustrative of the process and products of the present invention, but are not to be construed as limiting.

PREPARATION 1A

*9(11)-Dehydro-17α-Methyltestosterone*

A warm solution of one gram of 11α-hydroxy-17-methyltestosterone (I, U.S. Patent 2,660,586) in two milliliters of dry pyridine was mixed with one gram of para-toluenesulfonyl chloride. The mixture was maintained at room temperature for eighteen hours and then poured into 25 milliliters of water. The mixture was stirred until the precipitated oil solidified. The solid was filtered, washed with water and dried to give 1.41 grams of 11α-p-toluenesulfonyloxy-17α-methyl-17β-hydroxy-4-androsten-3-one which melted at 144 to 148 degrees centigrade with decomposition and, after crystallization from a mixture of methylene chloride and hexane hydrocarbons, melted at 141 to 144 degrees centigrade with decomposition and had an $[\alpha]_D$ of plus 41 degrees in chloroform and the analysis below.

*Anal.*—Calculated for $C_{27}H_{36}O_5S$: C, 68.61; H, 7.68; S, 6.78. Found: C, 68.86; H, 7.86; S, 6.89.

A mixture of one gram of the thus-produced 11α-p-toluenesulfonyloxy-17α-methyl-17β-hydroxy-4-androsten-3-one, 0.2 gram of sodium formate, 0.57 milliliter of water and fourteen milliliters of absolute ethanol was heated at its reflux temperature for a period of nineteen hours. The solution was cooled and then poured onto fifty grams of a mixture of ice and water with stirring. The resulting procipitate was filtered and dried to give 0.59 gram of 9(11)-dehydro-17α-methyltestosterone which melted at 156 to 160 degrees centigrade and, after crystallization from a mixture of methylene chloride and hexane hydrocarbons, melted at 167 to 170 degrees centigrate and had an $[\alpha]_D$ of plus 57 degrees in chloroform and the analysis below:

*Anal.*—Calculated for $C_{20}H_{28}O_2$: C, 79.96; H, 9.39. Found: C, 79.59; H, 9.08.

PREPARATION 1B

9α-Bromo-11β-Hydroxy-17α-Methyltestosterone

To a solution of one gram of 9(11)-dehydro-17α-methyltestosterone (Preparation 1A) in fifty milliliters of acetone was added dropwise, with stirring, at fifteen degrees centigrade, one gram of N-bromoacetamide dissolved in 25 milliliters of water. A solution of twenty milliliters of 0.8 normal perchloric acid was then slowly added at the same temperature. After twenty minutes, there was added a sufficient amount of a saturated aqueous solution of sodium sulfite to discharge the yellow color of the solution. The resulting mixture was then diluted with 100 milliliters of water thereby precipitating one gram of 9α-bromo-11β-hydroxy-17α-methyltestosterone as needles melting at 153 to 155 degrees centigrade.

PREPARATION 1C

9β,11β-Epoxy-17α-Methyltestosterone

A suspension of one gram of 9α-bromo-11β-hydroxy-17α-methyltestosterone (Preparation 1B) in thirty milliliters of methanol, was titrated with one molar equivalent of 0.1 normal aqueous sodium hydroxide. The resulting mixture was diluted with fifty milliliters of water and then chilled to about zero degrees centigrade thereby precipitating 0.64 gram of 9β,11β-epoxy-17α-methyltestosterone melting at 170 to 176 degrees centigrade which, after crystallization from dilute methanol, melted at 165 to 172 degrees centigrade (with sublimation) and had an $[\alpha]_D$ of minus forty degrees in chloroform and the analysis below.

*Anal.*—Calculated for $C_{20}H_{28}O_3$: C, 75.92; H, 8.92. Found: C, 75.60; H, 8.96.

PREPARATION 2

2α-Methyl-11β-Hydroxy-17α-Methyltestosterone

A. 2-METHOXYOXALYL-11β-HYDROXY-17α-METHYLTESTOSTERONE

To a solution of 3.18 grams (0.01 mole) of 11β-hydroxy-17α-methyltestosterone (U.S. 2,735,854) and 2.9 milliliters of diethyl oxalate dissolved in 45 milliliters of tertiary butyl alcohol at fifty degrees centigrade was added, with stirring, 3.4 milliliters of a 24 percent solution of sodium methoxide in absolute methanol. After twelve minutes, 150 milliliters of ether was added and stirring was continued for an additional fifteen minutes. Then the mixture was filtered and the collected precipitate was washed with ether and dried at 25 degrees centigrade at reduced pressure. The dried precipitate was dissolved in forty milliliters of water to which was then added fifteen milliliters of ten percent hydrochloric acid with stirring and cooling. The resulting precipitate was collected by filtration, washed with water and dried to give 3.57 grams, a yield of 85 percent of the theoretical of 2-methoxyoxalyl-11β-hydroxy-17α-methyltestosterone melting at 120 to 123 degrees centigrade.

B. 2-METHOXYOXALYL-2-METHYL-11β-HYDROXY-17α-METHYLTESTOSTERONE

To a cold solution of 3.4 grams of 2-methoxyoxalyl-11β-hydroxy-17α-methyltestosterone and fifteen milliliters of methyl iodide in thirty milliliters of acetone was added twenty grams of anhydrous potassium carbonate and the resulting mixture was stirred for 64 hours. The mixture was diluted with 300 milliliters of water and then extracted with three 100-milliliter portions of methylene chloride. The combined extracts were washed with water and dried. The methylene chloride solution was evaporated leaving a glassy residue of 2-methoxyoxalyl-2-methyl-11β-hydroxy-17α-methyltestosterone.

C. 2α-METHYL-11β-HYDROXY-17α-METHYLTESTOSTERONE

The glassy residue of 2-methoxyoxalyl-2-methyl-11β-hydroxy-17-methyltestosterone described above was dissolved in twenty milliliters of methanol to which was then added two milliliters of a 24 percent solution of methanolic sodium methoxide and the mixture then allowed to stand for three hours at 25 degrees centigrade. The mixture was then diluted with 100 milliliters of water and extracted with three 50-milliliter portions of methylene chloride. The methylene chloride was evaporated leaving 2.8 grams of residue which was redissolved in fifty milliliters of methylene chloride. The solution was then diluted with fifty milliliters of Skellysolve B hexane hydrocarbons and then poured over a chromatographic column of 120 grams of Florisil synthetic magnesium silicate. The column was developed with 250-milliliter portions of solvent of the following fractions, composition and order: four of Skellysolve B plus five percent acetone, fourteen of Skellysolve B plus six percent acetone, five of Skellysolve B plus seven percent acetone and eight of Skellysolve B plus eight percent acetone. The solvent was evaporated from last Skellysolve B plus seven percent acetone eluate and all but the last Skellysolve B plus eight percent acetone eluates and the combined residual solid, which weighed 1.004 grams, was redissolved in five milliliters of warm acetone to which was then added twelve milliliters of Skellysolve B and the mixture distilled until crystallization commenced. There was thus obtained 0.587 gram of 2α-methyl-11β-hydroxy-17α-methyltestosterone melting at 217 to 219 degrees centigrade, having an $[\alpha]_D$ of plus 125 degrees (C, 1.0323 in chloroform) and the analysis below.

*Anal.*—Calculated for $C_{21}H_{32}O_3$: C, 75.86; H, 9.70. Found: C, 75.44; H, 9.78.

Following the procedure of Preparation 2, but substituting ethyl iodide for the methyl iodide, there is thus produced 2-methoxyalyl-2-ethyl-11β-hydroxy-17α-methyltestosterone and 2α-ethyl-11β-hydroxy-17α-methyltestosterone. Substituting another lower-alkyl halide, e.g., methyl bromide, ethyl bromide, allyl chloride, n-propyl iodide or other alkyl halide wherein the alkyl group contains from one to eight carbon atoms, inclusive, for the methyl iodide, there are produced other 2-methoxyalyl-2-lower-alkyl-11β-hydroxy-17α-methyltestosterones and 2α-lower-alkyl-11β-hydroxy-17α-methyltestosterones, e.g., 2α-ethyl-11β-hydroxy-17α-methyltestosterone, 2α-n-propyl-11β-hydroxy-17α-methyl testosterone, 2α-allyl-11β-hydroxy-17α-methyltestosterone, possessing anabolic gonadotropic inhibiting, central nervous system modifying and antiinflammatory activity.

Substituting another 11β-hydroxy-17α-lower-alkyltestosterone, e.g., 11β-hydroxy-17α-ethyltestosterone, 11β-hydroxy-17α-n-propyltestosterone, or other 11β-hydroxy-17α-lower-alkyltestosterone wherein the 17α-lower-alkyl group contains from one to eight carbon atoms, inclusive, as the starting steroid in Preparation 2 there are thus produced other 2-methoxyoxalyl-2-methyl-11β-hydroxy-17α-lower-alkyltestosterones and 2α-methyl-11β-hydroxy-17α-lower-alkyltestosterones, e.g., 2α-methyl-11β-hydroxy-17α-ethyltestosterone and 2α - methyl - 11β - hydroxy - 17α - n-propyl-testosterone and other 2α-methyl-11β-hydroxy-17α-lower-alkyl testosterones wherein the 17α-lower-alkyl group contains from one to eight carbon atoms, inclusive.

Similarly, by selection of the appropriate 11β-hydroxy-17α-lower-alkyltestosterone as the starting steroid and the appropriate lower-alkyl halide as the alkylating agent, combinations of the above compounds, e.g., 2α 17α-di-lower-alkyl-11β-hydroxytestosterones are prepared according to the method of Preparation 2 wherein both of the lower-alkyl groups are other than methyl, e.g., ethyl, propyl, or other lower-alkyl group.

Following the procedure of Preparation 2 but substituting another di-lower-alkyl oxalate for the di-ethyl oxalate, e.g., dimethyl oxalate, dipropyl oxalate, methyl propyl oxalate, methyl butyl oxalate, the same 2-methyl-2-lower-alkoxyoxalyl-11β-hydroxy-17α-methyltestosterone is prepared and converted to 2α-methy-11β-hydroxy-17α-methyltestosterone.

Substituting a lower-alkyl formate for the diethyl oxalate employed in Preparation 2, e.g., methyl formate, ethyl formate, there are thus produced 2-formyl-11β-hydroxy-17α-methyltestosterone and 2-formyl-2-methyl-11β-hydroxy-17α-methyltestosterone which is also converted to 2α-methyl-11β-hydroxy-17α-methyltestosterone in the manner described in Preparation 2. Similarly, substituting a lower-alkyl trifluoroacetate, e.g., methyl or ethyl trifluoroacetate, for the diethyl oxalate of Preparation 2 is productive of 2-trifluoromethylacetyl-11β-hydroxy - 17α - methyltestosterone and 2-trifluoroacetyl-2-methyl-11β-hydroxy-17α-methyltestosterone which is also converted to 2α-methyl-11β-hydroxy-17α-methyltestosterone. A 2-carbonyl-lower-alkoxy-11β-hydroxy-17α-methyltestosterone, which is similarly converted to a 2α-methyl-11β-hydroxy-17α-methyltestosterone, is prepared by substituting a lower-alkyl carbonate e.g., ethyl carbonate, for the diethyl oxalate of Preparation 2.

PREPARATION 3

*2α-Methyl-11β-Hydroxy-17α-Methyltestosterone 17-Acetate*

A solution of one gram of 2α-methyl-11β-hydroxy-17-methyltestosterone in 25 milliliters of acetic anhydride was refluxed under nitrogen for one hour, cooled and diluted with 100 milliliters of ice water. The product was extracted with ether, washed with water, five percent sodium hydroxide solution, and water. The ether solution was dried with sodium sulfate and evaporated to dryness. The residue was dissolved in 25 milliliters of methylene chloride, poured onto a column containing forty grams of Florisil, and eluted with increasing proportions of acetone in Skellysolve B. The first substance thus eluted was crystallized from alcohol-Skellysolve B to give 2α-methyl-11β-hydroxy-17-methyltestosterone 17-acetate.

PREPARATION 4

*2α-17α-Dimethyl-9(11)-Dehydrotestosterone 17-Acetate*

To a solution of one gram of 2α-methyl-11β-hydroxy-17α-methyltestosterone 17-acetate dissolved in ten milliliters of dry pyridine was added, with stirring at 25 degrees centigrade in a nitrogen atmosphere, 0.5 gram of N-bromoacetamide portionwise. The stirring was continued for fifteen minutes and the mixture was then cooled to ten degrees centigrade. Anhydrous sulfur dioxide gas was then bubbled into the cooled mixture until the mixture gave a negative test with acidified starch-iodide paper. The stirred mixture was then mixed with ten milliliters of water followed by cold dilute hydrochloric acid prepared by mixing fifteen milliliters of concentrated hydrochloric acid with 25 grams of ice. The precipitated solid was collected, washed with water, dried and then crystallized from a mixture of methylene chloride and Skellysolve B hexane hydrocarbons and then from dilute acetone to give 2α,17α-dimethyl-9(11)-dehydrotestosterone 17-acetate.

PREPARATION 5

*2α,17α-Dimethyl-9(11)-Dehydrotestosterone*

To a solution of 0.5 gram of 2α,17α-dimethyl-9(11)-dehydrotestosterone acetate in 15 milliliters of methanol 1 gram of potassium hydroxide in five milliliters of water was added. The mixture was refluxed for one hour under nitrogen then quenched with water. The product thus obtained was recrystallized from a mixture of methylene chloride and Skellysolve B (hexane hydrocarbons) to yield pure 2α,17α-dimethyl-9(11)-dehydrotestosterone.

EXAMPLE 1

*2 - Methoxyoxalyl - 9(11) - Dehydro - 17α - Methyltestosterone (17β - Hydroxy - 2 - Methoxyoxalyl - 17α-Methyl - 4,9(11) - Androstadien - 3 - One)*

10.5 grams of 9(11)-dehydro-17α-methyltestosterone (17β - hydroxy - 17α - methyl - 4,9(11) - androstadiene-3 - one) (Preparation 1A) was dissolved in 150 milliliters of tertiary-butyl alcohol, ten milliliters of diethyl oxalate was added and the solution warmed to about 55 degrees centigrade. Eleven milliliters of a 25 percent solution of sodium methoxide in methanol was added and after fifteen minutes the reaction mixture was cooled to 25 degrees centigrade and 450 milliliters of ether added with stirring. After fifteen minutes the mixture was filtered and the precipitate washed with ether and dried. The dry precipitate was dissolved in 100 milliliters of water and acidified with ten percent hydrochloric acid. The product was washed with water to yield 5.5 grams of 2-methoxyoxalyl-9(11)-dehydro-17α-methyltestosterone. The ether filtrate previously set aside was concentrated to approximately 100 milliliters and fifty milliliters of five percent aqueous sodium carbonate solution added and the layers separated. The aqueous layer was acidified to give an oil which yielded an additional 5.3 grams of 2-methoxyoxalyl-9(11)-dehydro-17α-methyltestosterone.

Substituting another 9(11)-dehydro-17α-lower-alkyltestosterone, e.g., 9(11)-dehydro-17α-ethyltestosterone, 9(11)-dehydro-17α-n-propyltestosterone, or other 9(11)-dehydro-17α-lower-alkyltestosterone wherein the 17α-lower-alkyl group contains from one to eight carbon atoms, inclusive, as the starting steroid in Example 1, there are thus produced other 2-methoxyoxalyl-9(11)-dehydro-17α-lower-alkyltestosterones, e.g., 2-methoxyoxalyl-9(11) - dehydro - 17α - ethyltestosterone, 2 - methoxyoxalyl - 9(11) - dehydro - 17α - n - propyltestosterone and other 2 - methoxyoxalyl - 9(11) - dehydro - 17α - lower-alkyltestosterones wherein the 17α-lower-alkyl group contains from one to eight carbon atoms, inclusive.

Substituting a lower-alkyl formate for the diethyl oxalate employed in Example 1, e.g., methyl or ethyl formate, there is thus produced 2α-formyl-9(11)-dehydro-17α-methyltestosterone which is converted to 2α,17α-dimethyl-9(11)-dehydrotestosterone in the manner described in Example 2. Similarly, substituting a lower-alkyl trifluoroacetate, e.g., methyl or ethyl trifluoroacetate, for the diethyl oxalate of Example 1, is productive of 2-trifluoroacetyl-9(11)-17α-methyltestosterone which is also converted to 2α,17α-dimethyl-9(11)-dehydrotestosterone in the manner described in Example 2. A 2-carbonyl-lower - alkoxy - 9(11) - dehydro - 17α - methyltestosterone which is similarly converted to 2α,17α-dimethyl- 9(11)-dehydrotestosterone, is prepared by substituting a lower-alkyl carbonate, e.g., ethyl carbonate, for the diethyl oxalate of Example 1.

EXAMPLE 2

2α,17α - Dimethyl - 9(11) - Dehydrotestosterone (17β-Hydroxy - 2α,17α - Dimethyl - 4,9(11)Androstadien-3-One)

A mixture containing 5.5 grams of 2-methoxyoxalyl-9(11)-dehydro-17α-methyltestosterone (Example 1), fifty milliliters of acetone, twenty milliliters of methyl iodide and 25 grams of anhydrous potassium carbonate was stirred for 54 hours. 300 milliliters of water was added and the resulting mixture extracted with three 100 milliliter portions of methylene chloride. The extract was washed, dried and evaporated to dryness. The residue was dissolved in fifty milliliters of absolute methanol and 3.5 milliliters of a 25 percent solution of sodium methoxide in methanol added. The solution was allowed to stand for four hours, then diluted with 300 milliliters of water and extracted with ether. The ether extract was washed with water, dried over sodium sulfate and evaporated to yield 4.14 grams of crude 2α,17α-dimethyl-9(11)-dehydrotestosterone (17β-hydroxy-2α,17α-dimethyl-4,9(11)-androstadien-3-one), an oral anabolic compound possessing a high ratio of anabolic to androgenic activity.

The product was chromatographed over a column of 160 grams of Florisil (a synthetic magnesium silicate) and eluted with 250 milliliter fractions of a mixture of acetone and Skellysolve B (hexane hydrocarbons):

Fractions 1 to 17—acetone:Skellysolve B—6:94
Fractions 18 to 21—acetone:Skellysolve B—15:85

Fractions five to seven contained 2.47 grams of product. They were combined and recrystallized from acetone:Skellysolve B to give 1.78 grams of crystalline 2α,17α-dimethyl-9(11)-dehydrotestosterone with a melting point of 150 to 153 degrees centigrade.

*Anal.*—Calculated for $C_{21}H_{30}O_2$: C, 80.21; H, 9.62. Found: C, 80.34; H, 9.66.

Similarly, by selection of the appropriate 2-lower-alkyloxyoxalyl-9(11)-dehydro-17α-lower - alkyltestosterone as the starting steroid and the appropriate lower-alkyl halide as the alkylating agent, combinations of the above compounds, e.g., 2α,17α-di-lower alkyl-9(11) - dehydrotestosterones are prepared according to the method of Example 2 wherein one or both of the lower-alkyl groups are other than methyl, e.g., ethyl, propyl or other lower-alkyl group.

EXAMPLE 3

9α-Bromo-2α,17α-Dimethyl-11β-Hydroxytestosterone (9α-Bromo-11β,17β-Dihydroxy-2α,17α-Dimethyl-4 - Androsten-3-One)

4.81 grams of 2α,17α-dimethyl-9(11)-dehydrotestosterone (Example 2) was dissolved in 150 milliliters of acetone and cooled to fifteen degrees centigrade. 2.3 grams of N-bromoacetamide dissolved in 45 milliliters of water was added with stirring. In the course of five minutes 92 milliliters of a solution of 0.8 normal perchloric acid that had been chilled to ten degrees centigrade was slowly added to the reaction mixture and stirring continued for twenty minutes. Seven milliliters of a saturated aqueous solution of sodium sulfite was added and the mixture diluted with 500 milliliters of water, cooled and filtered to yield 4.69 grams of crystalline 9α-bromo-2α,17α-dimethyl - 11β - hydroxytestosterone, with a melting point of 125–140 degrees centigrade.

Following the procedure described in Example 3, but substituting as starting steroid other 2α,17α-di-lower-alkyl-9(11)-dehydrotestosterones is productive of the corresponding 9α-bromo-2α,17α-di-lower-alkyl - 11β - hydroxytestosterones.

EXAMPLE 4

9α-Bromo - 2α,17α - Dimethyl - 11 - Ketotestosterone (9α-Bromo - 11 - Keto - 17β - Hydroxy - 2α,17α-Dimethyl-4-Androsten-3-One)

A solution of 0.5 gram of chromium trioxide and one milliliter of water in twenty milliliters of acetic acid was added to a solution of one gram of 9α-bromo-2α,17α-dimethyl - 11β - hydroxytestosterone in fifty milliliters of glacial acetic acid. The mixture was maintained at room temperature for five hours and then mixed with ten milliliters of methanol. The solvent was removed by distillation at reduced pressure and the almost dry residue mixed with fifty milliliters of water. The precipitate was filtered, washed with water and then dried to give 0.85 gram of 9α-bromo-2α,17α-dimethyl-11-ketotestosterone.

Following the procedure described in Example 4, but substituting as starting steroid other 9α-bromo-2α,17α-di-lower-alkyl 11β-hydroxytestosterones is productive of the corresponding 9α-bromo-2α,17α-di-lower-alkyl - 11 - ketotestosterones.

EXAMPLE 5

9β,11β-Epoxy-2α,17α-Dimethyltestosterone (9β,11β - Epoxy-17β-Hydroxy-2α,17α-Dimethyl-4-Androsten-3-One)

114 milliliters of a 0.1 normal solution of sodium hydroxide was added slowly to a stirred suspension of 4.68 grams (0.0114 mole) of 9α-bromo-11β-hydroxy-2α,17α-dimethyltestosterone in 140 milliliters of methanol containing one drop of phenolphthalein. The volume of sodium hydroxide solution added was enough to render the steroid suspension just alkaline. After one hour the reaction mixture was acidified with six drops of acetic acid and diluted with 150 milliliters of water. The mixture was extracted three times with 100 milliliters of methylene chloride and the extract washed, dried and evaporated to give 3.99 grams of crude crystalline 9β,11β-epoxy-2α,17α-dimethyltestosterone.

To purify the product it was dissolved in fifty milliliters of methylene chloride, fifty milliliters of Skellysolve B added and the steroid chromatographed over a column of 160 grams of Florisil. Elution was as follows using 180 milliliter fractions of a mixture of acetone and Skellysolve B:

Fractions 2 to 6—acetone:Skellysolve B—5:95
Fractions 7 to 17—acetone:Skellysolve B—9:91
Fractions 18 to 24—acetone:Skellysolve B—10:90

Fractions 11 to 19 were combined to give 2.57 grams of product with a melting point of 150 to 170 degrees centigrade. Recrystallization from a mixture of acetone and Skellysolve B yielded 1.70 grams of 9β,11β-epoxy-2α,17α-dimethyltestosterone with a melting point of 175 to 176 degrees centigrade. The Beilstein test was negative and rotation $[\alpha]_D$ minus ten degrees (chloroform). Infrared absorption maxima were: OH, 3390 centimeters$^{-1}$; conjugated ketone, 1668 centimeters$^{-1}$; conjugated C=C, 1623 centimeters$^{-1}$.

*Anal.*—Calculated for $C_{21}H_{30}O_3$: C, 76.32; H, 9.15. Found: C, 76.86; H, 9.52.

Following the procedure described in Example 5, but substituting as starting steroid other 9α-bromo-11β-hydroxy-2α,17α-di-lower-alkyltestosterones is productive of the corresponding 9β - 11β - epoxy-2α,17α-di-lower-alkyl-testosterones.

EXAMPLE 6

2-Methoxyoxalyl-9β,11β-Epoxy - 17α - Methyltestosterone (17β - Hydroxy - 2 - Ethoxyoxalyl-17α-Methyl-9β,11β-Epoxy-4-Androsten-3-One)

Ten grams of 9β,11β-epoxy-17α-methyltestosterone (Preparation 1C) was dissolved in 150 milliliters of tertiary butyl alcohol, ten milliliters of diethyl oxalate was added and the solution warmed to about 55 degrees centigrade. Eleven milliliters of a 25 percent solution of sodium methoxide in methanol was added and after fifteen minutes the reaction mixture was cooled to 25 degrees centigrade and 450 milliliters of ether added with stirring. After fifteen minutes the mixture was filtered and the precipitate washed with ether and dried. The dry precipitate was dissolved in 100 milliliters of water and acidified with ten percent hydrochloric acid. The product was washed with water to yield 10.5 grams of 2-methoxyoxalyl-9β,11β-epoxy-17α-methyltestosterone.

Substituting another 9β,11β-epoxy-lower-alkyltestosterone, e.g., 9β,11β-epoxy-17α-ethyltestosterone, 9β,11β-epoxy-17α-n-propyltestosterone, or other 9β,11β-epoxy-17α-lower-alkyltestosterone wherein the 17α-lower-alkyl group contains from one to eight carbon atoms, inclusive, as the starting steroid in Example 6, there are thus produced other 2-methoxyoxalyl-9β-11β-epoxy-17α-lower-alkyltestosterones, e.g., 2-methoxyoxalyl-9β,11β-epoxy-17α-ethyltestosterone, 2-methoxyoxalyl-9β,11β-epoxy-17α-n-propyltestosterone and other 2-methoxyoxalyl-9β,11β-epoxy-17α-lower-alkyltestosterones wherein the 17α-lower-alkyl group contains one to eight carbon atoms, inclusive.

Substituting a lower-alkyl formate for the diethyl oxalate employed in Example 6, e.g., methyl or ethyl formate, there is thus produced 2α-formyl-9β,11β-epoxy-17α-methyl-testosterone which is converted to 2α,17α-dimethyl-9β,11β-epoxytestosterone in the manner described in Example 7. Similarly, substituting a lower-alkyl trifluoroacetate, e.g., methyl or ethyltrifluoroacetate, for the diethyl oxalate of Example 6, is productive of 2-trifluoromethylacetyl-9β,11β-epoxy-17α-methyltestosterone which is also converted to 2α,17α-dimethyl 9β,11β-epoxytestosterone in the manner described in Example 7. A 2-carbonyl-lower-alkoxy-9β,11β-epoxy - 17α - methyltestosterone which is similarly converted to 2α,17α-dimethyl-9β,11β-epoxytestosterone, is prepared by substituting a lower-alkyl carbonate, e.g., ethyl carbonate, for the diethyl oxalate of Example 6.

EXAMPLE 7

*9β,11β-Epoxy - 2α,17α - Dimethyltestosterone (9β,11β-Epoxy-17β-Hydroxy-2α,17α-Dimethyl-4-Androsten - 3-One)*

A mixture containing 9.5 grams of 2-methoxyoxalyl-9β,11β-epoxy-17α-methyltestosterone (Example 6), 100 milliliters of acetone, forty milliliters of methyl iodide and fifty grams of anhydrous potassium carbonate was stirred for 54 hours. 600 milliliters of water was added and the resulting mixture extracted with three 200-milliliter portions of methylene chloride. The extract was washed, dried and evaporated to dryness. The residue was dissolved in 100 milliliters of absolute methanol and seven milliliters of a 25 percent solution of sodium methoxide in methanol added. The solution was allowed to stand for four hours, then diluted with 600 milliliters of water and extracted with ether. The ether extract was washed with water, dried over sodium sulfate and evaporated to yield 9.5 grams of crude 9β,11β-epoxy-2α,17α-dimethyltestosterone (9β,11β-epoxy-17β-hydroxy-2α,17α-dimethyl-4-androsten-3-one).

The crude product dissolved in 100 milliliters of methylene chloride and 100 milliliters of Skellysolve B was chromatographed over a column of 300 grams of Florisil and eluted with 250 milliliter fractions of a mixture of acetone and Skellysolve B.

Fractions 1 to 11—acetone:Skellysolve B—7:93
Fractions 12 to 23—acetone:Skellysolve B—8:92

Fractions 14 to 22, inclusive, were combined and yielded 2.2 grams of product which had a melting point of 148 to 170 degrees centigrade. Recrystallization from a mixture of methylene chloride, acetone and Skellysolve B gave 1.66 grams of 9β,11β-epoxy-2α,17α-dimethyltestosterone with a melting point of 170 to 172 degrees centigrade. The infrared spectrum of the steroid compound was identical with that obtained from the product of Example 5.

EXAMPLE 8

*9α-Fluoro-11β-Hydroxy-2α,17α-Dimethyltestosterone*

A solution containing 1.2 grams of 9β,11β-epoxy-2α,17α-dimethyltestosterone in 25 milliliters of methylene chloride in a polyethylene bottle was cooled to minus fifteen degrees centigrade and 1.8 milliliters of 48 percent aqueous hydrofluoric acid added. The reaction mixture was stirred at plus five degrees centigrade for 42 hours and then poured slowly into a mixture containing five grams of sodium bicarbonate in fifty milliliters of ice water. The layers were separated and the aqueous stratum extracted with two 25 milliliter portions of methylene chloride. The combined extract was washed with water, dried over sodium sulfate and concentrated to dryness to yield 1.18 grams of residue. The dried product was dissolved in methylene chloride and chromatographed over a column of forty grams of Florisil and eluted with fifty milliliter fractions consisting of a mixture of nine percent acetone and 91 percent Skellysolve B. Fractions 14 to 21, inclusive, contained 569 milligrams of solid and were combined and recrystallized from ether to give 370 milligrams of solvated product. Drying at 110 degrees centigrade for three hours in vacuo yielded 9α - fluoro - 11β-hydroxy-2α,17α-dimethyltestosterone with a melting point of 179 to 181 degrees centigrade, a [α]$_D$ of plus 100 degrees (in chloroform) and the analysis below.

*Anal.*—Calculated for $C_{21}H_{31}FO_3$: C, 71.97; H, 8.92; F, 5.42. Found: C, 72.07; H, 9.28; F, 5.29.

In addition to the principal product, 9α-fluoro-11β-hydroxy-2α,17α-dimethyltestosterone, a by-product, 2,17-dimethyl-4,16-androstadien-3-one is also recovered as described in the following procedure. A solution containing 169 grams of 9β,11β, epoxy-2α,17α-dimethyltestosterone in 100 milliliters of methylene chloride cooled to minus seventy degrees centigrade was added to 268 grams of anhydrous hydrogen fluoride in 140 milliliters of methylene chloride and 568 milliliters of tetrahydrofuran. The red solution was maintained at minus fifteen degrees centigrade for four hours then poured into a stirred solution of 1880 grams of potassium carbonate in 6700 milliliters of water containing 5000 milliliters of crushed ice. The product was extracted with methylene chloride which was washed with water, dried, concentrated to a small volume and diluted with benzene. Concentration of this solution yielded crystals if the benzene solvate of 9α-flluoro-11β-hydroxy-2α,17α - dimethyltestosterone with a melting point of 105 to 115 degrees centigrade (accompanied by evolution of gas). The solvate resolidified and had a melting point of 145 to 200 degrees centigrade. [α]$_D$ plus 99 degrees (chloroform; λ max. 238.5 mμ (Am=16,000).

Concentration of the filtrate gave 8.6 grams of the dehydrated by-product, 9α-fluoro - 11β-hydroxy-2,17-dimethyl-4,16-androstadien-3-one, with a melting point of 240 degrees centigrade, [α]$_D$ plus 91 degrees (chloroform). This compound exhibits gonadotropin inhibiting, central nervous system modifying and anabolic properties with improved therapeutic ratios. The benzene solvate was converted into non-solvated product by repeated crystallization from methylene chloride-Skellysolve B hexane hydrocarbons to give 9α-fluoro-11β-hydroxy-2α,17α-dimethyltestosterone with a melting point of 128 to 133 degrees centigrade; [α]$_D$ plus 116 degrees (chloroform; λ$_{max}$$^{alc.}$ 238 mμ (Am=15,000). The non-solvated product forms an ether solvate on crystallization from ether, which, like the benzene solvate and non-solvated product, is converted on heating at 110 degrees centigrade for three to 24 hours into the dehydrated compound, 9α - fluoro - 11β-hydroxy - 2,17-dimethyl-4,16-androstadien-3-one.

Following the procedure described in Example 8, but substituting as starting steroid other 9β,11β-epoxy-2α,17α-di-lower-alkyltestosterones is productive of the corresponding 9α-fluoro-11β-hydroxy-2α,17α-di-lower-alkytestosterones.

In the same manner as described in Example 8, reacting 9β,11β-epoxy-2α,17α-dimethyltestosterone with hydrochloric acid or hydrobromic acid is productive of 9α-chloro-11β-hydroxy-2α,17α-dimethyltestosterone or 9α-bromo-11β-hydroxy-2α,17α-dimethyltestosterone possessing physiologic properties similar to those of the corresponding 9α-fluoro compounds but of somewhat different potencies and therapeutic ratios. Similarly, 9α-chloro-11β-hydroxy-2α,17α-di-lower-alkyltestosterones or 9α-bromo-11β-hydroxy-2α,17α-di-lower-alkyltestosterones are prepared by substituting 9β,11β-epoxy-2α,17α-di-lower-alkyltestosterone as the starting steroid.

EXAMPLE 9

*9α-Fluoro-2α-17α-Dimethyl-11-Ketotestosterone (9α-Fluoro-11-Keto-17β-Hydroxy-2α,17α-Dimethyl-4-Androsten-3-One)*

A solution of 0.5 gram of chromium trioxide and one milliliter of water in twenty milliliters of acetic acid was added to a solution of one gram of 9α-fluoro-2α,17α-dimethyl-11β-hydroxytestosterone in fifty milliliters of glacial acetic acid. The mixture was maintained at room temperature for five hours and then mixed with ten milliliters of methanol. The solvent was removed by distillation in vacuo and the nearly dry residue mixed with fifty milliliters of water. The precipitate was filtered, washed with water and then dried to yield 0.95 grams of 9α-fluoro-2α,17α-dimethyl-11-ketotestosterone.

Following the procedure described in Example 9, but substituting as starting steroid other 9α-fluoro-2α,17α-di-lower-alkyl-11β-hydroxytestosterones is productive of the corresponding 9α-fluoro-2α,17α-di-lower-alkyl-11-ketotestosterones possessing the same type of activity as the corresponding 11β-hydroxy compounds.

It is to be understood that the invention is not to be limited to the exact details of operation or exact compounds shown and described, as obvious modifications and equivalents will be apparent to one skilled in the art to which this invention pertains, and the invention is therefore to be limited only by the scope of the appended claims.

We claim:

1. 9α-fluoro-11β-hydroxy-2α,17α-dimethyl-4,16-androstadien-3-one.

2. 17β-hydroxy-2α,17α-dimethyl-4,9(11)-androstadien-3-one.

References Cited in the file of this patent

UNITED STATES PATENTS

| | | |
|---|---|---|
| 2,793,218 | Herr | May 21, 1957 |
| 2,837,464 | Nobile | June 3, 1958 |
| 2,842,573 | Herr et al. | July 8, 1958 |
| 2,883,401 | Babcock et al. | Apr. 21, 1959 |